3,059,036
PREPARATION OF VINYL METAL COMPOUNDS
Julian B. Honeycutt, Jr., Baton Rouge, La., assignor to Ethyl Corporation, New York, N.Y., a corporation of Delaware
No Drawing. Filed Mar. 28, 1960, Ser. No. 17,772
4 Claims. (Cl. 260—665)

The present invention is concerned with the preparation of vinyl metal compounds especially those of the alkali metals.

There have been many attempts heretofore to prepare the vinyl compounds of the alkali metals. Up until the present time such processes have been only of minor success or no success at all. For example, methyl substituted vinyl bromides have been reacted with lithium metal in diethyl ether to give the corresponding methyl substituted vinyl metal compound. This procedure is objectionable, however, since one-half of the lithium metal is consumed in producing the lithium salt as a by-product. An attempt has been further made to react vinyl chloride with lithium metal in tetrahydrofuran. Although it has been reported that reaction occurs, no vinyllithium product was apparently obtained. Additionally, vinyl bromide has been reacted with certain organolithium reagents in an attempt to produce vinyllithium products, however, only products derived from dilithioacetylide were obtained.

While some reactions have been performed wherein an organometallic compound is reacted with another organometallic compound to result in an exchange reaction producing different organometallic compounds, this reaction has been of limited utility because of inherent pecularities therein, e.g. the reactions are reversible, and, so far as now known, has not been applied for the production of vinyl alkali metal compounds.

Likewise, it is known that lithium metal can be reacted with certain organometallic compounds, particularly the dialkyl mercury compounds to produce the corresponding alkyl lithium compounds. This procedure is applicable only in certain instances and suffers the disadvantage of requiring an excess of the metal.

Thus, it is desirable to provide a method for the preparation of the vinyl alkali metal compounds since such are of considerable use as will be brought forth hereinafter. It is particularly desirable to provide a method for producing vinyllithium.

Accordingly, it is an object of the present invention to provide a new and novel process for the preparation of vinyl metal compounds, particularly those of the alkali metals. A further object is to provide such compounds in high yield and purity. A specific object is to provide a novel process for the production of vinyllithium. These and other objects will be evident as the discussion proceeds.

It has now been found that vinyl alkali metal compounds can be readily prepared by a direct synthesis involving reacting the alkali metal with a vinyl compound of a metal having an electromotive potential lower than that of the alkali metal employed. Of the alkali metals, lithium, potassium, and sodium are preferred because of economy and greater availability. Likewise, best results are obtained when the metal of the vinyl metal reactant is one of the metals of group IV–A of the periodic chart of the elements, particularly tetravinyllead. Solvents can be employed to advantage in the process, especially when the vinyl metal reactant or product is generally solid under reaction conditions. Ethers are particularly suitable for this purpose, especially when vinyllithium is the product. Although a wide range of temperatures is applicable in conducting the process, it is preferable to employ a temperature between 0 to 70° C. Thus, a particularly preferred embodiment of the present invention is the reaction of lithium, sodium, or potassium, especially lithium, with tetravinyllead at 0 to 70° C., preferably in the presence of an ether.

The process of this invention is of particular advantage in that vinyl alkali metal compounds are obtained in high yield and in a simple, clear-cut, reaction. Likewise, quite unexpectedly, the reaction proceeds to completion and is not complicated by the problem of reversibility frequently encountered in the prior art methods. Another advantage to the process is that the vinyl metal compound is obtained in a high state of purity which is readily recoverable from the reaction system, if desired. These and other advantages of the process of this invention will be apparent as the discussion proceeds.

The alkali metals comprise the metals of group I–A of the periodic chart of the elements, e.g. lithium, sodium, potassium, rubidium, and cesium. In general, these metals can be employed in any form as, for example, the solid state or the liquid state, as leaflets or as finely divided particles. When the process is conducted under conditions wherein the alkali metal is normally a solid, it is preferable that it be employed in a finely divided state because of the greater reactivity and faster reaction rates obtained. For this purpose, the well known ribbons, leaflets, or wires are applicable. It is especially preferred that in these instances, the dispersions of the metals be employed, e.g. a dispersion of sodium, potassium, or lithium in a hydrocarbon or ether wherein the average particle size is preferably below about 50 microns, and especially below about 20 microns. Such dispersions are readily achieved by agitating the metal at a temperature above its melting point in the presence of a hydrocarbon or ether in various concentrations, preferably of the order of about 25 to 50 percent by weight, of the metal, to achieve fine subdivision, then cooling to below the melting point of the metal. These dispersions give even faster reaction rates as well as being easier to handle. Lithium dispersions in glass should be avoided because of reaction of the lithium with the glass. Of the alkali metals, lithium, potassium, and sodium are preferred, especially lithium and sodium.

The vinyl metal reactant is a vinyl compound of a metal lower in the electromotive series of the elements than are the alkali metals. In general, such compounds will contain at least one vinyl group and the remaining substituents attached to the metal will be organic radicals or other ligands such as the halides. Included among such vinyl metal compounds are, for example, vinyl-magnesium bromide, chloride, iodide, and fluoride; divinylmercury, divinyl boron chloride, tetravinylsilane, tetravinyltin, tetravinyllead, diphenyldivinyltin, dibutyldivinyltin and the like compounds wherein all radicals other than the vinyl radicals preferably contain less than about 10 carbon atoms and are aliphatic, alicyclic, aromatic or heterocyclic radicals such as ethyl, butyl, octyl, allyl, cyclohexyl, phenyl, tolyl, benzyl, and the like. Similar examples of such compounds and other metals and metalloids capable of forming stable organometallic compounds, particularly of the group II–A, II–B, III–A, IV–A, and V–A elements of the periodic chart of the elements as set forth in the Handbook of Chemistry, Lange, eighth edition, at pages 56 and 57 will be evident. It is preferable that the metal have only vinyl groups attached thereto and that it be a group IV–A metal, especially tin or lead since best results and a more economical process are obtained when vinyl compounds of such metals are employed. Vinyllead compounds, particularly tetravinyllead, are especially advantageous vinyl metal compounds to be employed because of the higher yields obtained.

The process of this invention will be further understood from a consideration of the following examples. In each instance, all parts are by weight.

*Example I*

Lithium metal was hammered to leaf form under argon and then cut into small pieces. To a reactor equipped with high speed internal agitation, external heating means, and a means for maintaining an argon atmosphere, was added 2.2 parts of such lithium metal, along with 0.002 part of benzophenone, and 25 parts of diethyl ether, which had been previously dried over sodium. Then 12.4 parts of tetravinyllead were added to the reactor and the mixture stirred for 2 hours without heating. Within 10 minutes of addition of the tetravinyllead, the solution turned black and began to vigorously boil. The refluxing stopped after 1 hour and 20 minutes. After the completion of the reaction period and cessation of the agitation, fine black powdery metallic lead settled at the bottom of the reactor and no lithium floating on top of the solution was evident. The reaction mixture was filtered recovering a yellow solution of the vinyllithium in the diethyl ether. The ether was then removed by subjecting the filtrate to a vacuum at room temperature. The solid residue remaining was washed with petroleum ether and 4.8 parts of a white solid was obtained after filtration representing a 90 percent yield. A portion of the product was again dried under vacuum for ½ hour at room temperature. Analysis showed 70.77 percent carbon and 8.93 percent hydrogen whereas vinyllithium theoretically contains 70.69 percent carbon and 8.90 percent hydrogen.

*Example II*

Employing the reactor of Example I and the same general procedure, 1.68 parts of the flaked lithium were reacted with 4.54 parts of tetravinyltin in 7.1 parts of diethyl ether and the presence of 0.008 part of benzophenone. The suspension turned black within 2 hours but was continuously agitated for an additional period of about 15 hours. The product was then isolated as in Example I and the yield of essentially pure vinyllithium was 42.5 percent. When this procedure was repeated except that the reaction time was only 4 hours, a 55 percent yield of vinyllithium was obtained.

*Example III*

When Example II is repeated with exception that the lithium metal is reacted with tetravinyltin in the same proportions in the absence of the ether and the benzophenone for 2 hours at 0° C., vinyllithium is again produced in high yield in admixture with tin metal. The vinyllithium is readily recovered from the tin metal by dissolving with diethyl ether, filtering the resulting suspension and, if desired, removing the ether by vacuum distillation.

*Example IV*

A finely divided dispersion of sodium metal is prepared by first adding 23 parts of sodium to 200 parts of toluene. The mixture is heated to 105° C. and vigorously agitated for ½ hour, then cooled to room temperature resulting in a dispersion of the sodium metal having an average particle size of about 10 microns. To this dispersion is then added 80 parts of tetravinyllead and agitation at room temperature is continued for 2 hours. Vinyl sodium is produced in a high yield.

*Example V*

Example I is repeated substituting potassium, rubidium, or cesium metal in equivalent amount for the lithium with the temperature being maintained at 20° C. for 2 hours. Vinyl potassium, rubidium, or cesium are obtained in high yield and can be used as obtained by the reaction without further separation.

*Example VI*

Vinyllithium in admixture with phenyllithium is produced in high yield when a 50 percent dispersion of finely divided lithium metal in the diethyl ether of diethylene glycol is reacted with diphenyldivinyllead at 70° C. for 2 hours.

*Example VII*

When 7 parts of finely divided lithium metal is reacted with 114 parts of divinyl mercury in triethylamine at 50° C. for one hour, vinyllithium product is obtained in high yield.

*Example VIII*

Vinyl sodium in admixture with phenyl sodium is produced in high yield when essentially the stoichiometric amount of finely divided sodium suspended in the dimethyl ether of diethylene glycol is reacted with vinyltriphenyllead at 70° C. for 3 hours.

Similar results are obtained when dimethyl divinyl germanium is substituted for the vinyltriphenyllead with the reaction temperature at 20° C. in the above example.

*Example IX*

When finely divided lithium metal is reacted with vinyl magnesium chloride in essentially a 2:1 molar ratio respectively in diethyl ether at the reflux temperature for 2 hours, vinyllithium is obtained.

*Example X*

Finely divided lithium suspended in tetrahydrofuran is reacted with divinyl boron chloride in essentially a 3:1 molar ratio at room temperature for one hour and then the reaction mixture is filtered. A solution of vinyllithium in tetrahydrofuran is obtained in high yield.

It is not intended that the present invention be restricted or limited by the above presented examples. Such are provided merely as illustrations. For example, satisfactory results are obtained when one substitutes other vinyl metal reactants in place of those presented in the examples.

Generally, temperatures up to the decomposition temperature of the reactants or products are employable. For simplification in processing, reflux temperature or lower is employed in order to avoid the necessity of pressure operation. When temperatures much above about 100° C. are used some side reactions may occur as, for example, ether cleavage when an ether is employed as a diluent. Therefore, in a preferred operation the temperature is generally between about 0 to 70° C. with pressure being used where necessary to maintain a liquid system or reflux temperature being employed when the system will boil at a temperature below 70° C. Room temperature, e. g. 25° C. and lower, is particularly advantageous to avoid side reactions and give high yields. As indicated there is no necessity for pressure operation but such can be employed particularly when temperatures above the boiling point of the reaction mixture are used.

Since the reactants and products are generally highly reactive to the atmosphere, it is desirable to conduct the reaction in an essentially inert atmosphere. For this purpose such inert gases as nitrogen, argon, neon, krypton, xenon, preferably pre-dried, and vacuum are employable.

The reaction is fairly rapid so that relatively short periods of reaction are required. Generally speaking, times longer than about five hours are not needed and reaction periods of less than about 3 hours are preferred.

Diluents or solvents are not essential to the process but can be used to particular advantage, as for example, heat distribution and solution. The organic solvents which are essentially inert under the reaction conditions and liquid are applicable. For such purpose the hydrocarbons, ethers, and tertiary amines have been found most suitable. Among the hydrocarbons are included both aliphatic and aromatic materials as, for example, the hexanes, octanes, nonanes, cyclohexanes, benzene, tetralin and the like. The ethers include, for example, diethyl ether, diamyl ether, dioctyl ether, methylamyl ether, diphenyl ether, dibenzyl ether, cyclic ethers, such as dioxane, tetrahydrofuran and the polyethers as, for example, the dimethyl, diethyl, dibutyl and the like ethers of ethylene glycol, diethylene glycol, triethylene glycol, and tetraethylene glycol. Included among the tertiary amines are, for example, trimethyl amine, triethyl amine, tri-n-butyl amine, triphenyl amine, dimethyl aniline, N-methyl piperdine, N-ethylmorpholine, and the like. While many of the ethers and amines will complex with certain reactants and products, this does not hinder their use. For best results in connection with fast reaction and easy recovery of the product vinyl metal compound either in solution or as a precipitate in accordance with the above discussion, the ethers, particularly the simple or monoethers, e.g. diethyl ether, having up to about 8 carbon atoms are preferred especially when a lithium compound is desired. When a product of the other alkali metals, e.g. sodium, is desired such ethers can be employed especially at lower temperature, e.g. below about 30° C., but liquid hydrocarbons are preferred at higher temperatures.

In conducting the process an excess of either reactant can be employed. If an excess is employed, it is preferable that the metal reactant be in excess. Excesses of the metal up to about 100 percent and higher are employable since the metal is readily recovered and recycled. For practical reasons as well as fast reaction 20 to 50 percent excess of the alkali metal is preferred. The amount of solvent, when such is employed, is generally sufficient to provide fluidity of the reaction system. Thus, amounts as high as 100 parts by weight per part by weight of the alkali metal reactant employed and higher can be used. In the preferred embodiments of this invention vinyllithium is produced. It is advantageous to employ at least sufficient solvent, especially the ethers, to dissolve essentially all of the vinyllithium metal product under the conditions of reaction and separation of the product from the by-product.

As indicated by some of the above examples, it is also useful to employ ketones in the reaction system in contact with the alkali metal since such activate the surface of the metal. In general, any hydrocarbon ketone which is liquid or soluble under the reaction conditions is employable as, for example, amyl methyl ketone, amyl ether ketone, benzyl ethyl ketone, benzyl methyl ketone, butyl methyl ketone, cyclobutyl phenyl ketone, dibutyl ketone, dibenzyl ketone, benzyl propenyl ketone, ethyl butyl ketone, and the like and especially the aryl ketones such as benzophenone, phenyl naphthyl ketone, and the like. In general, such ketones preferably will contain up to and including about 18 carbon atoms. When employed, it is preferred that they be used in amount between about 0.001 to 0.02 part by weight of the alkali metal.

The process of this invention provides products which are of considerable utility, namely the vinyl alkali metal compounds. For example, such compounds can be employed for the formation of other vinyl metal compounds. A typical example of such utility is the reaction of the product obtained by Example I with arsenic trichloride at room temperature whereby trivinyl arsine is obtained in high yield. Likewise, when triethyl chlorosilane is reacted with vinyl sodium, vinyl triethylsilane is obtained. Another use of the products of this invention is reaction with carbon dioxide to produce acrylic acid. Acrylic acid is useful in the formation of polymers. Still further, the products can be used as catalysts or in catalyst formulations to be employed in the polymerization of olefins, particularly ethylene, propylene, isoprene, isobutene, and copolymers thereof. For example, vinyllithium, vinyl sodium, or vinyl potassium in combination with an equivalent amount of a group IV–B, V–B or VI–B metal halide, especially the titanium tetra- and trichlorides can be used as catalysts for the polymerization of ethylene at temperatures between 0 to 200° C. and pressures between about atmospheric and 5000 p.s.i. These and other uses of the products produced will be evident to those skilled in the art.

Having thus described the process of this invention, it is not intended that it be limited except as set forth in the following claims.

I claim:
1. The process for the production of vinyllithium which comprises reacting finely divided lithium metal with tetravinyllead at a temperature between about 0 to 70° C. in the presence of an ether solvent.
2. A process for the production of vinyl lithium which comprises reacting finely divided lithium metal with tetravinyl lead at a temperature between about 0° and 70° C.
3. The process of claim 2 wherein the reaction is conducted in an organic solvent.
4. The process for the production of vinyl lithium which comprises reacting finely divided lithium metal with tetravinyl lead at about 35° C. in diethyl ether.

References Cited in the file of this patent
UNITED STATES PATENTS

| | | |
|---|---|---|
| 2,734,091 | Londergan | Feb. 7, 1958 |
| 2,985,691 | Foster | May 23, 1961 |

OTHER REFERENCES

Rochow et al.: "The Chemistry of Organo-Metallic Compounds," pages 48–49, John Wiley & Son Inc., New York, 1957.